A. CLIFT, Jr.
Churn.
No. 54,861.
Patented May 22, 1866.
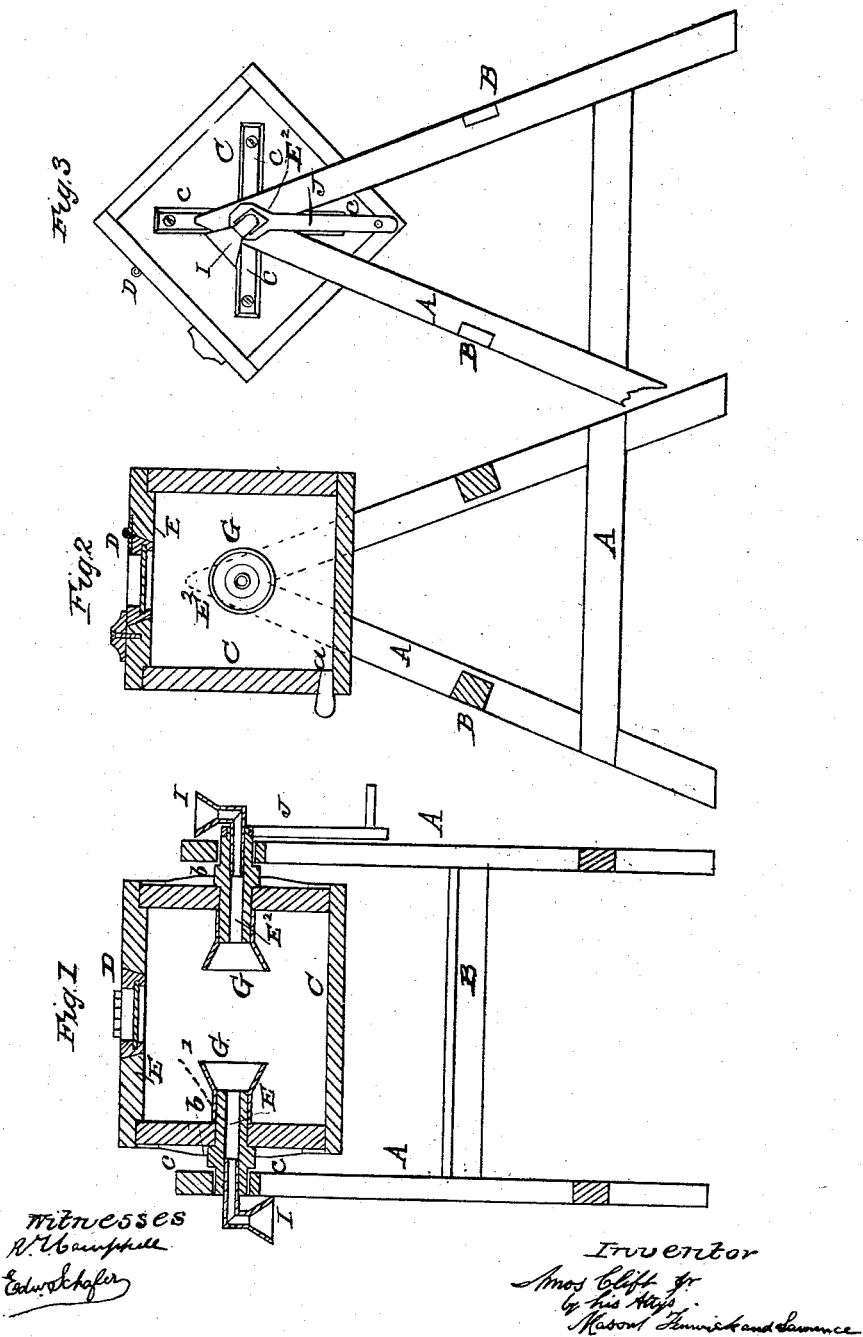

UNITED STATES PATENT OFFICE.

AMOS CLIFT, JR., OF MYSTIC RIVER, CONNECTICUT.

IMPROVEMENT IN CHURNS.

Specification forming part of Letters Patent No. 54,861, dated May 22, 1866.

*To all whom it may concern:*

Be it known that I, AMOS CLIFT, Jr., of Mystic River, in the county of New London and State of Connecticut, have invented a new and useful Improvement in Churns for Making Butter; and I do hereby declare that the following is a full, clear, and exact description of the same, reference being had to the accompanying drawings, forming part of this specification, in which—

Figure 1 is a vertical longitudinal section of my improved churn. Fig. 2 is a vertical transverse section of the same, and Fig. 3 is an end view of the churn.

Similar letters of reference in the different figures indicate like parts.

My improvement relates to the well-known square or flat-sided box-churn which rotates bodily on an axis.

The nature of the improvement which I have invented consists in the arrangement of the rectangular box or other suitable-shaped cream-chamber on short hollow axles, the inner ends of said axles having funnels overhanging or surrounding them.

My first improvement enables me to use hollow axles, through which air may be introduced into the cream during the churning operation without liability of the agitated cream or milk being thrown out of the cream-chamber through said hollow axles.

My arrangement is such that no obstructions beside the inner funnels are required in the interior chamber of the churn-box, and hence the churn is readily cleaned and can be furnished at a small cost.

To enable others skilled in the art to make and use my invention, 1 will proceed to describe the same with reference to the drawings.

A A are two triangular end supports tied together by longitudinal rails B B, as shown.

C is a four-sided box, made nearly square, being only a little longer than it is broad. One side of this box is constructed with a door, D, which is beveled on its edges, and fits cream-tight into a corresponding aperture, E, as shown. Instead of this door one of the sides of the box may be attached by hinges and fastened by a turn-button or hook. A glass pane may be set in this hinged cover, so that the cream may be inspected during the churning process. A draw-off hole for the buttermilk may be formed in one side near the bottom of the box, as indicated at *a*. This hole is to be plugged during the churning process.

The box thus constructed has a round or square hole cut centrally in each of its ends to admit of the insertion of short hollow journals or axles $E'$ $E^2$, as shown. These axles are cast with a shoulder or collar, *b*, and with four attaching-arms, *c c c c*, at shown. The collar bears against the outside surface of the end of the box, so as to make a tight joint, and also against the inside surface of the bearing portion of the support A, as shown. The short axles or journals are fitted by a square or by a key to the holes in the ends of the box, so that the box turns with them. The outer ends of the shafts have their bearings in the supports, so as to turn free of the same.

G G are removable funnels—flaring enlargements applied around the inner ends of the journals or axles. These funnels, by their position and form, serve to throw back any cream which may be dashed toward the hollow journals, and if any cream lodges within them it will, by reason of the inclined plane formed by every part of the funnel, be conducted back into the box.

I I are hoods or air-catches applied on the outer ends of the hollow journals. A better form than the funnel shown would be an overhanging cap or a funnel with one portion of it cut away.

J is a crank applied on one of the journals for the purpose of revolving the box, in order to churn the cream or milk.

The operation is as follows: The box is supplied with cream or milk sufficient to nearly half fill it. The lid is then made tight. All being ready, the box is revolved, and the cream thereby violently pitched from one side to the other of the box. During this process the funnels on the inside prevent the escape of the cream through the hollow journals, while the hollow journals and their hoods insure a sufficient supply of fresh air into the churn amidst the cream. The hoods, on account of pressing the air through the journals, compel the cream to remain in the box.

By having the inner funnels detachable they can be taken out and cleaned after the butter has been produced. This is a very important thing in a churn, for if the inside of the churn cannot be readily cleaned the butter produced will be discolored and have a bad taste to it.

I am aware that air has been admitted into revolving churns of this character through one of the journals; also, that a long hollow shaft with hollow branch air-tubes has been used in such churns; but I do not regard the plans heretofore devised as well suited to the purpose intended as the simple and effective arrangement herein described and shown.

Having thus described my invention and set forth its operation and advantages, what I claim as new, and desire to secure by Letters Patent, is—

1. The combination of the hollow journals or axles, constructed with flaring enlargements on their inner ends, with the revolving churn-box, substantially in the manner and for the purpose described.

2. Making the inner funnels removable, substantially as and for the purpose described.

AMOS CLIFT, JR.

Witnesses:
WILLIAM MURPHY,
C. H. JOHNSON.